BIRD HOUSE WITH CLEAN-OUT DOOR

Original Filed May 18, 1962 3 Sheets-Sheet 1

INVENTOR.
Arthur E. Vail
BY Silverman, Mullin & Cass
Attys.

BIRD HOUSE WITH CLEAN-OUT DOOR

Original Filed May 18, 1962 3 Sheets-Sheet 2

INVENTOR.
Arthur E. Vail
BY Silverman, Mullin & Cass
Attys.

BIRD HOUSE WITH CLEAN-OUT DOOR

Original Filed May 18, 1962 3 Sheets-Sheet 3

INVENTOR.
Arthur E. Vail

BY Silverman, Mullin & Cass
Attys.

United States Patent Office

Re. 25,878
Reissued Oct. 12, 1965

25,878

BIRD HOUSE WITH CLEAN-OUT DOOR

Arthur E. Vail, Griggsville, Ill., assignor to Trio Manufacturing Co., Griggsville, Ill., a corporation of Illinois Original No. 3,111,934, dated Nov. 26, 1963, Ser. No. 195,830, May 18, 1962. Application for reissue Feb. 1, 1965, Ser. No. 445,296
10 Claims. (Cl. 119—23)

Matter enclosed in heavy brackets [ ] appears in the original patent but forms no part of this reissue specification; matter printed in italics indicates the additions made by reissue.

This invention relates generally to bird houses and more particularly, relates to an improved multi-apartment bird house adapted to be constructed from lightweight sheet metal with each compartment provided with a clean-out door in a side wall thereof.

Although not necessarily limited thereto, the bird house embodying the invention is especially useful for attracting and housing martins. It is well known that martins are prodigious and effective destroyers of garden insects and pests so that it is very desirable to attract martin colonies to residential areas. Martins will return to nest in the same bird house year after year provided the bird house is clean, that is, nests, twigs, debris, etc. of other birds do not occupy the bird house upon return of the martins. For instance, sparrows will occupy martin houses after the martins depart so that it is necessary to clean out the bird house in order that the martins will return to nests. Although, there have been available multi-compartment martin houses formed of stacked tiers of apartments, these have been unsatisfactory insofar as permitting easy and convenient cleanout of the individual apartments so as to induce return of the martins. For instance, these prior bird houses required substantial dismantling in order to provide access to the individual compartments, such as, separating the tiers forming the bird house, removing the bird house from its mounting, collapsing entire sections thereof and the like. Also prior structures have not permitted cleaning out of individual apartments without disturbing martins occupying adjacent apartments.

Further, prior martin houses have been heavy and cumbersome to manufacture and install, have been improperly ventilated, have not supplied the desired perches and have been costly to manufacture and maintain.

Accordingly, it is a primary object of the invention to provide a bird house of the character described which is characterized by a construction capable of substantially eliminating all of the disadvantages hereinabove enumerated.

A major object of the invention is to provide a bird house of the character described formed of lightweight sheet metal and having a bird apartment provided with a hingedly connected clean-out door as a wall thereof.

Another important object of the invention is to provide a multi-apartment bird house formed of sheet metal, each apartment having a separate clean-out door forming a wall of the apartment so that each apartment may be cleaned out without disturbing any adjacent apartment and without requiring any dismantling of the bird house.

Another object of the invention is to provide a bird house of the character described in which each apartment has a front wall provided with an access opening therein for the bird, said front wall having bearing means for pivotally mounting same on the bird house so that it can be moved selectively for functions of a clean-out door for the apartment.

A further object of the invention is to provide a bird house as described in which the floor of each apartment has novel latch means for releasably locking the clean-out door thereof in closed [portion] *position.*

Another object of the invention is to provide a bird house of the character described having a plurality of nesting apartments provided by one or more tiers and the tiers are detachably secured together to permit assembly of the bird house using one or more tiers, as desired, in a convenient and easy manner and which permits adding or subtracting of tiers without removing the bird house from its mount.

Another important object of the invention is to provide a martin house as described which can be shipped in collapsed condition for easy and rapid erection and the site of use.

Other objects of the invention reside in the economical and compact structure for the bird house embodying the invention, the long-life of the bird house and the small amount of maintenance required therefor.

These and other objects, advantages, and functions of the invention will become apparent upon reference to the specification and to the attached drawings illustrating preferred embodiments of the invention, in which like parts are identified by like reference symbols in each of the views, and in which.

Figure 2:
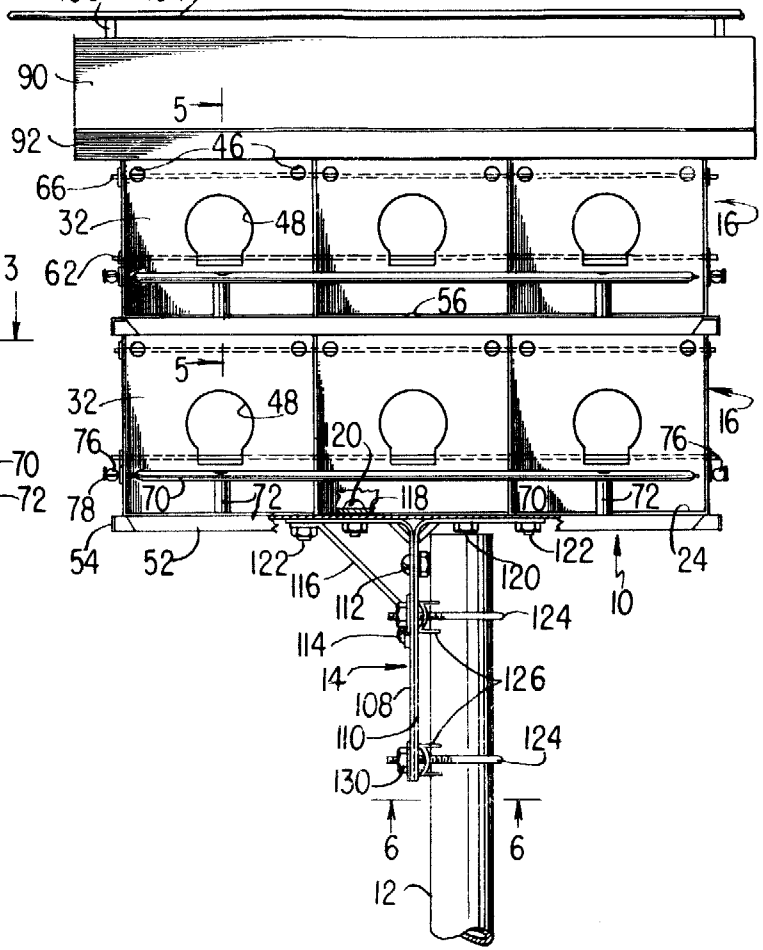
FIG. 2 is a front elevational view thereof with parts broken away, the rear view being a mirror image thereof.
Figure 1:
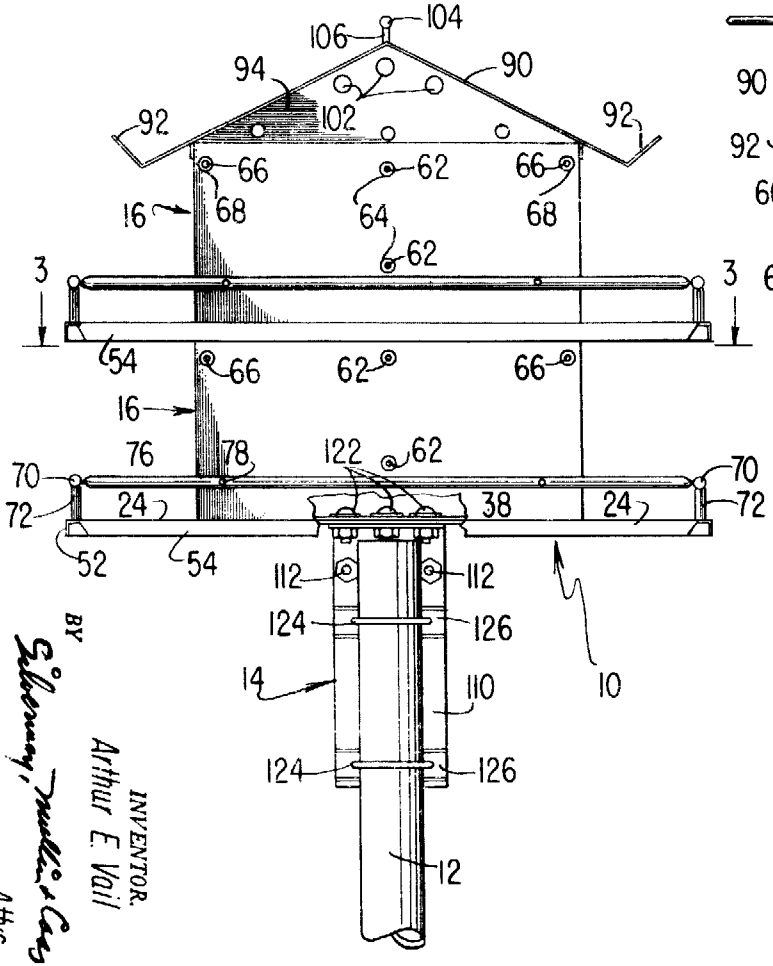
FIG. 1 is a side elevational view of one embodiment of the bird house, shown mounted on a post and with parts broken away to illustrate the connections to a mounting bracket.

Referring now to the drawings, one embodiment of a bird house constructed according to the invention is indicated generally by the reference character 10 in FIGS. 1 and 2. It is illustrated mounted on a post 12 by means of a metal mounting bracket 14. Preferably, the bird house is constructed of lightweight, durable sheet metal such as aluminum. The post 12 may be a metal tube or rod mounted in a suitable manner on a building or a vertical mast or standard and in any desirable location. The configuration of the post 12 or the material from which it is formed may vary.

Figure 4:
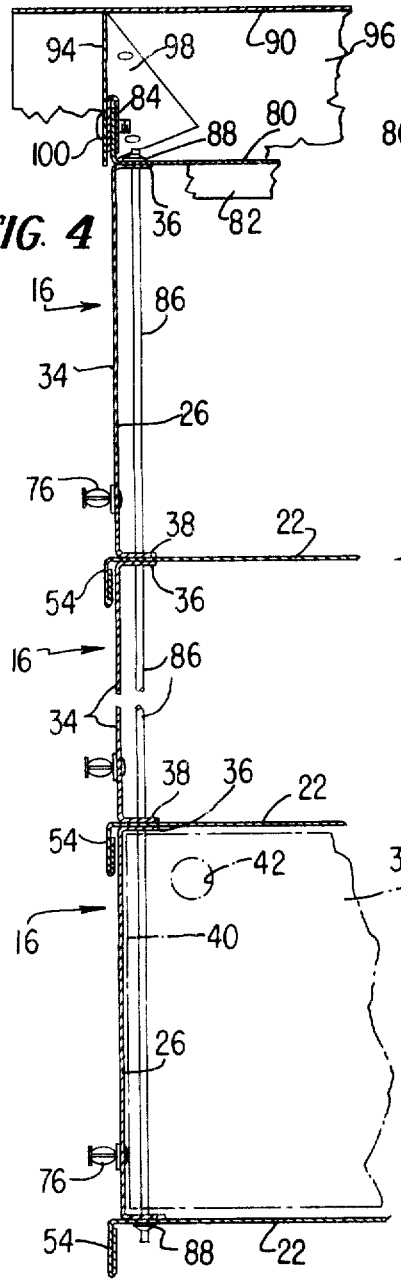
FIG. 4 is an enlarged broken fragmentary vertical sectional view of another embodiment of the bird house which includes an additional tier, taken substantially on line 4—4 of FIG. 3.

The embodiment of FIGS. 1 and 2 is erected from two identical tiers 16, and the embodiment of FIG. 4 is erected from three tiers 16, stacked in superposed relation to provide two and three story bird houses, respectively. Alternatively, a single-story bird house may be assembled from a single tier. The tiers are detachably secured together, as subsequently will be described, so that individual tiers may be added and subtracted from the bird house as desired.

Figure 3:
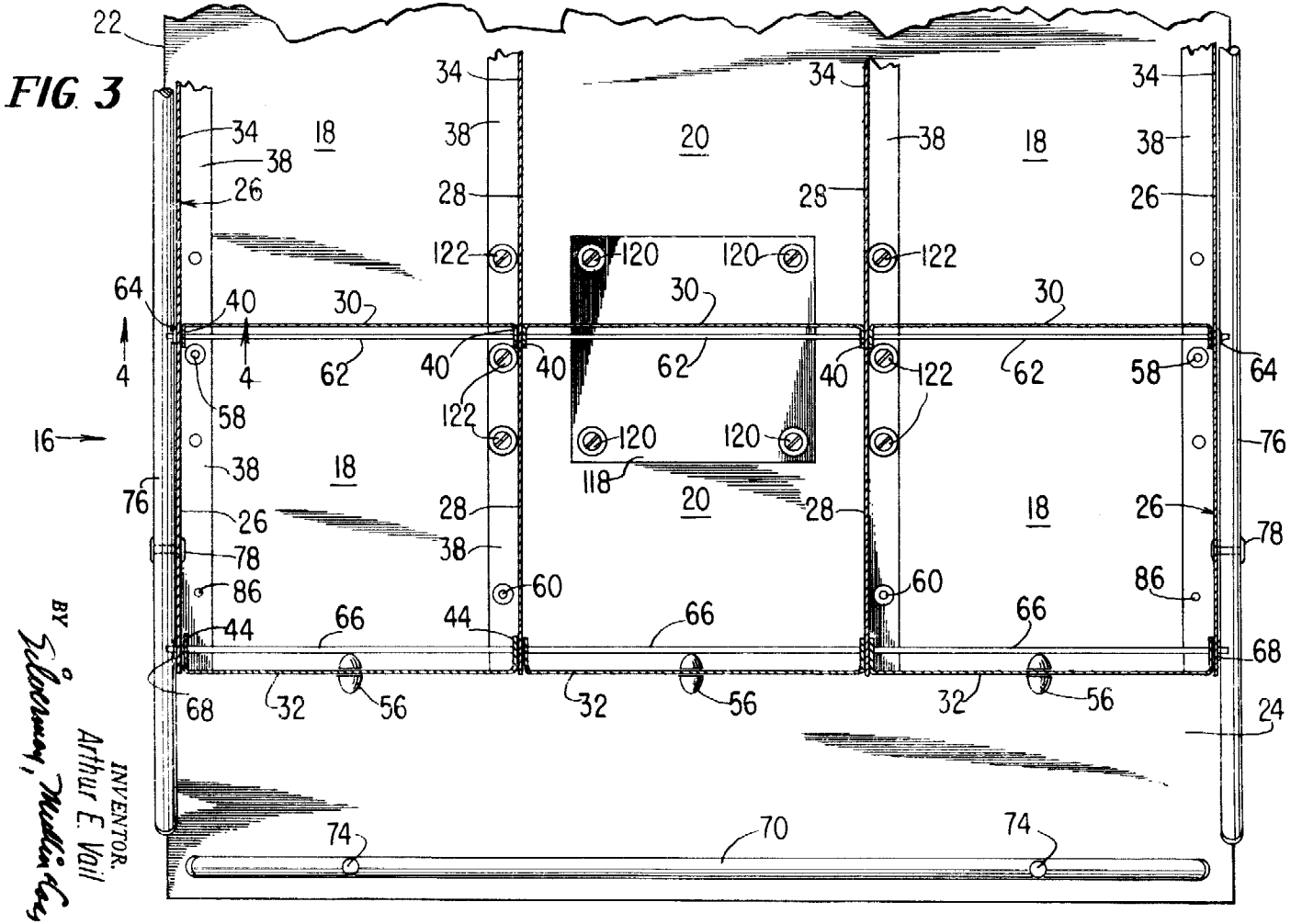
FIG. 3 is an enlarged, fragmentary sectional view taken along the line 3—3 of FIG. 1 and in the general direction indicated.

Referring to FIG. 3, each tier 16 includes two rows of three nesting compartments arranged back to back, thus facing in opposite directions, the successive compartments in each row being numbered 18, 20 and 18. Each tier includes four corner compartments 18 and two central or intermediate compartments 20. The compartments of the two rows all have a common floor 22 which extends forwardly of each of the respective rows of compartments to provide two balconies 24, as seen in FIG. 1.

Each corner compartment 18 is rectangular and is bounded by four side walls, including an outer side wall 26, an inner side wall 28, an inner back wall 30, and an outer front wall 32. Each central compartment 20 is rectangular, and is bounded by two inner side walls 28, an inner back wall 30, and an outer front wall 32. Referring also to FIG. 4, the outer side walls 26, and similarly the inner side walls 28, are constructed of sheet metal panels 34 which extend across both rows of compartments. The panels have upper and lower integral coextensive horizontal mounting flanges or strips 36 and 38, respectively, which extend inwardly of the corner compartments. On each side of the tier 16, an outer and an inner panel 34 define two adjacent corner compartments 18 between them. Two inner side wall panels 34 form two adjacent central compartments 20.

Each of the back walls 30 of the several compartments is common to two adjacent compartments in the respective rows. The back walls are formed by upstanding metal panels having coextensive vertical side flanges or strips 40 along their opposite margins. The back walls 30 terminate a short distance below the upper flanges 36 of the side wall panels 34, and a short distance above the lower flanges 38 thereof, as illustrated in phantom lines in the lower tier 16 in FIG. 4. An opening 42 is provided adjacent each upper corner of each back wall which serves to ventilate the nesting compartments. The back walls are disposed about midway between the ends of the several pairs of side wall panels 34, to provide compartments 18 and 20 of substantially the same size.

Figure 5:
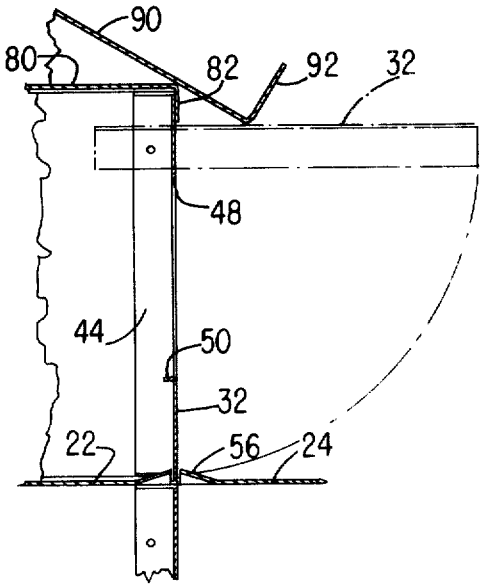
FIG. 5 is a fragmentary sectional view taken along line 5—5 of FIG. 2.
Figure 6:
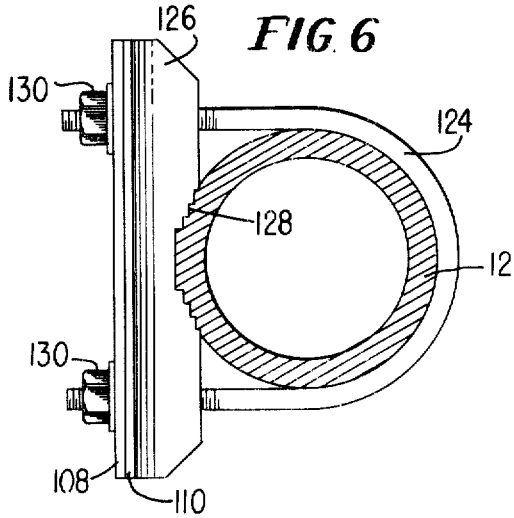
FIG. 6 is a horizontal sectional view taken along line 6—6 of FIG. 2, and showing the mounting bracket in bottom plan view.

Referring to FIGS. 2, 3 and 5, the front walls 32 are constructed somewhat like the back walls 30, and have inwardly turned vertical flanges 44 along their opposite side edges. A ventilation opening 46 is provided adjacent each upper corner of each front wall, and the openings register with the ventilation openings 42 in the back walls 30. Each front wall is also provided with a keyhole type entrance opening 48 which is especially suitable for access by adult birds. The base of the opening is turned in to form a narrow ledge or perch 50 (FIG. 5) and to avoid sharp edges which could harm the birds.

Each tier 16 is constructed as an individual unit, preferably of relatively thin lightweight sheet metal, such as aluminum. The floor 22 may be formed from a single metal sheet, and the margins are bent to provide depending front and side flanges 52 and 54, respectively (FIGS. 1, 2 and 4). As seen especially in FIGS. 3 and 5, integral catches 56 are formed in the floor, and they comprise transversely slotted upwardly projecting portions of the floor which receive the bottom edges of the front walls 32 in the slots thereof. The floor is also provided with a number of openings for the reception of various fastening means, which will be described.

Referring to FIGS. 3 and 4, each of the flanges 36 and 38 on the side wall panels 34 is provided with a number of openings which are the same for each flange. Some of the openings serve for securing the parts of each tier together; other openings serve for connecting the mounting bracket 14 to the lower tier; some of the openings serve for securing two or more tiers together; and some of the openings serve for securing a ceiling to the upper tier. The disposition of each flange determines the use made of the openings, and also depending upon such disposition, some of the openings may remain unused.

The respective outer and inner side wall panels 34 initially are mounted on the floor 22 by rivets or other suitable fastening means. A rivet 58 extends through a central opening in the lower flange 38 of the outer panel and through a corresponding opening in the floor. Two rivets 60 extend through respective openings at the opposite ends of the lower flange 38 of the inner panel 34, and through corresponding openings in the floor.

The back walls 30 are mounted on the side wall panels 34 by a pair of horizontal tie rods 62 which extend for the length of the compartment rows in vertically spaced parallel relation. The rods extend through openings in the back wall flanges 40 and in the side wall panels 34, and they are secured to the outer side wall panels such as, by push nut fasteners or by threaded ends on tie rods and nuts 64.

The front walls 32 in each row of compartments are hingedly mounted between the side wall panels 34 by a horizontal hinge rod 66 adjacent the top of each front wall. The hinge rod extends through pivot openings in the flanges 44 of the front walls 32, and through registering openings adjacent the outer ends of the side wall panels 34. The hinge rod is secured to the outer side wall panels 34 by push nut fasteners or by threaded ends on tie rods and nuts 68. As previously noted, the lower edges of the front walls 32 are received in the slotted portions of the catches 56 formed in the floor 22. The floor is formed of flexible material, preferably sheet metal, which may be depressed in the areas of the catches to release the front walls. The walls 32 then may be swung individually or separately outwardly to a substantially horizontal position well above the floor 22, as illustrated in phantom lines in FIG. 5. The floor has sufficient resiliency to return the catches 56 to their initial positions after being depressed. When a front wall is swung back to a closed or vertical position, its lower edge contacts the upwardly sloping front surface of the catch 56, depresses the catch and the floor, and enters the catch slot and is latched therein.

Each tier is provided with perches which also serve as guard rails for the young birds. A front perch rail 70 extends substantially for the width of each balcony 24, and is mounted thereon by means of tubular spacers 72 (FIGS. 1 and 2) and rivets 74 (FIG. 3) extending through the spacers and fastened to the balcony. A side perch rail 76 extends substantially from front to back along each outer side wall panel 34, and is fastened thereto by rivets 78. The side perches 76 are at substantially the same elevation as the front perches 70, and the perches together substantially enclose the balconies.

FIGS. 1, 2, 4 and 5 illustrate assemblies of two and three tiers 16 in stacked superposed relation to provide two and three story bird houses, respectively. The floor 22 of each tier forms the ceiling of the subjacent tier, and the depending bordering flanges 54 overlap the subjacent outer side wall panels 34 and receive the tier in nesting relation. The flanges serve to cover and protect the junctions of the side wall panels with the floor thereabove. The balconies 24 of each tier serve as eaves for the subjacent tier, and the front flanges 52 depending from the balconies extend below the upper edges of the subjacent front walls 32.

As seen in FIGS. 4 and 5, the upper tier 16 is covered by a ceiling 80. The ceiling includes integral depending flanges or strips 82 which overlap the upper ends of the front walls 32. The ceiling also includes integral upturned roof mounting flanges 84 at opposite sides. One, two or three tiers 16 are assembled by connecting tie rods 86 at the four corners, as seen in FIGS. 3 and 4. The rods extend through openings in the floors 22, through end openings in the flanges 36 and 38 of the outer side wall panels 34, and through openings in the ceiling 80. They are secured by push nut fasteners or by threaded ends on tie rods and nuts 88 at the opposite ends thereof, engaging the ceiling 80 and the lowermost floor 22, respectively. When it is desired to add or subtract tiers, the tie rods 86 can be removed, tiers added or substracted at the bottom of the assembly, and tie rods of suitable length are inserted in the same manner through the compartments to join the tiers together.

A one-piece gable roof 90 of sheet material is mounted on the upper tier 16 and overhangs the tier on all sides as seen in FIGS. 1, 2, 4 and 5. The roof terminates along the front sides in integral upturned flanges 92 which provide gutters. A gable 94 is joined to the roof and to the ceiling 80 at each end of the roof, to form an attic 96 with the ceiling. Each gable includes a pair of integral inwardly bent mounting flanges 98 (FIG. 4) which are secured to the roof as by riveting. Each gable is secured to an upturned flange 84 of the ceiling by a screw connection 100. Three ventilation openings 102 are formed in the gable near the ridge of the roof. A perch 104 is mounted on the roof and supported thereabove on spacers 106. The perch extends outwardly beyond the ends of the roof.

Referring to FIGS. 1–3 and 6, the bird house 10 is readily erected on a suitable post 12 by means of the mounting bracket 14. The post may be installed on a roof, a standard, or in any suitable location. The post may be a metal pipe or rod, or a wooden post. The bracket includes two oppositely extending angle plates 108 and 110 having a series of openings therein. The plates are bolted together as indicated at 112 in FIG. 2. A bolt 114 extends through the plates and secures the lower end of an inclined strut bar 116 thereto. As seen particularly in FIG. 3, a reinforcing plate 118 is placed on the floor 22 of the lower tier 16. The plate is located in the central compartments 20 and extends under the back wall 30 which divides the compartments. The angle plates 108 and 110 are secured to the floor and to the reinforcing plate by bolts 120 which extend therethrough. The angle plates are also secured to the floor and to the lower flanges 38 of the inner side wall panels 34 by bolts 122. One of the bolts 122 also serves to secure the upper end of the strut 116, as seen in FIG. 2.

The mounting bracket 14 is secured on the post 12 by U-bolts 124 and mast clamps 126. The mast clamps are constructed in the form of channel bars having serrated recesses 128 in the sides thereof which receive the round post and grip it tightly. The mast clamps are disposed between the angle plates 108 and 110, and the post 12. The U-bolts 124 are placed around the post, and extend through suitable openings in the mast clamps and in the angle plates. The bolts are drawn tightly by nuts 130 in threaded engagement with the ends of the bolts projecting beyond the opposite sides of the angle plates.

By this construction, the bracket 14 is connected centrally of the bird house 10, and the connections are strong and rigid. The bracket is firmly held in place on the post 12, which is on one side of the bracket. The strut 116 is disposed on the opposite side of the bracket. Alternatively, the bracket may be mounted on a wooden post or other support, employing suitable bolts or other fastening means in place of the U-bolts 124. Lag screws can be used in place of U-bolts and mast clamps as well as bolts.

In the illustrative preferred embodiments, the floor 22, the side wall panels 34, the back walls 30, the front walls 32, the ceiling 80, the roof 90 and the gables 94 are constructed of sheet metal panels, preferably aluminum. A baked enamel finish is provided on the floors, walls, and gables. The roof is constructed of reflective stucco-embossed bright aluminum. The ventilation openings 42 and 46 and the entrance openings 48 insure ample ventilation, and the upper tier is insulated by the ventilated attic 96. The construction is exceptionally cool, and it is light in weight and easily cleaned. It has a long useful life, during which it can be expanded or reduced in size conveniently when desired.

The separately hinged front side walls 32 provide very convenient cleanout doors for the individual compartments, enabling the compartments to be cleaned selectively in place. The catch 56 for each door is released simply by depressing the floor 22, whereupon the front wall may be swung outwardly by inserting a finger in the entrance opening 48, to expose the interior of the compartment. Unwanted nests may be removed from individual compartments without disturbing adjacent compartments. The floor of each compartment and the adjacent balcony 24 are continuous and free of obstructions, so that they may be cleaned thoroughly. When the front wall is returned to its closed position, it is engaged by the spring catch 56 and held securely in position.

The invention thus provides an improved bird house which has proven to be attractive to martins, and also embodies a number of features which are very advantageous for the home owner. It will be apparent that various changes and modifications may be made in the construction and arrangement of the components of the bird house within the spirit and scope of the invention. It is intended that such changes and modifications be included within the scope of the appended claims.

What it is desired to secure by Letters Patent of the United States is:

1. A multiple bird house comprising a plurality of nested individual compartments, a roof member covering said compartments, a floor member disposed beneath said compartments and extending outwardly of said compartments in two directions therefrom, thereby to define first and second balconies on opposite sides of said plurality of compartments, a like plurality of wall members individual to the compartments of said first named plurality and each having an upper portion rotatably mounted to a respectively associated compartment, said last named rotatably mounted wall members being mounted to face an adjacent one of said balconies, and being rotatable about an axis substantially parallel to said floor for opening said compartment to said associated balcony, said rotatable wall members respectively extending from said axis by a distance corresponding to the spacing of said floor member from said axis, a catch portion in said floor member for each of said compartments, said catch portion being disposed and arranged for releasably engaging the lower portion of the associated wall member upon downward rotation thereof.

2. A multiple bird house as set forth in claim 1 and in combination therewith a bird perch mounted to one of said outwardly extending balconies thereby to define a bounding rail therefor.

3. A multiple bird house as set forth in claim 1 wherein said roof member comprises first and second portions disposed in mutually intersecting, inclined relation to said compartments, thereby to define a gable roof having a peak extending above said compartments.

4. A multiple bird house as set forth in claim 1 and in combination therewith, a perch member mounted above said roof member.

5. A multiple bird house as defined in claim 3 and, in combination therewith, a perch member mounted above said roof extending substantially along said peak.

6. A multiple bird house as set forth in claim 1 and, in combination therewith, first and second perch members mounted respectively to said balconies outwardly of said compartments thereby to define railings for said balconies.

7. A multiple bird house as set forth in claim 1 wherein said rotatably mounted wall members each have an opening therethrough of a dimension admitting of passage of birds.

*8. A multiple bird house comprising a plurality of nested individual compartments, a roof member covering said compartments, a floor member disposed beneath said compartments and extending outwardly of said compartments in two directions therefrom, thereby to define first and second balconies on opposite sides of said plurality of compartments, a plurality of wall members each having a wall section individual to the compartments of said first named plurality of compartments and each having an upper portion rotatably mounted to a respectively associated compartment, said rotatably mounted wall members being mounted to face an adjacent one of said balconies, and being rotatable about an axis substantially parallel to said floor for opening said compartment to said associated balcony, said rotatable wall members respectively extending from said axis by a distance corresponding to the spacing of said floor member from said axis, at least one catch portion in said floor member for each of said*

*wall members, said catch portion being disposed and arranged for releasably engaging the lower portion of the associated wall member upon downward rotation thereof.*

*9. A multiple bird house comprising a plurality of individual compartments, a roof member covering said compartments, a floor member disposed beneath said compartments and extending outwardly of said compartments in two directions therefrom, thereby to define first and second balconies on opposite sides of said plurality of compartments, a plurality of wall members having sections thereof individual to the compartments of said first named plurality of compartments and each having an upper portion rotatably mounted to a respectively associated compartment, said rotatably mounted wall members each being mounted to face an adjacent one of said balconies, and being rotatable about an axis substantially parallel to said floor for opening said compartment to said associated balcony, said rotatable wall members respectively extending from said axis by a distance corresponding to the spacing of said floor member from said axis, at least one catch portion in said floor member for each of said wall members, each catch portion being disposed and arranged for releasably engaging the lower portion of the associated wall member upon downward rotation thereof.*

*10. A multiple bird house comprising a first plurality of individual compartments, a roof member covering said compartments, a floor member disposed beneath said compartments and extending outwardly of said compartments in two directions therefrom thereby to define first and second balconies on opposite sides of said compartments, a plurality of wall members, the said wall members closing said compartments and each having an upper portion*

*mounted rotatably thereto about an axis substantially parallel to said floor member, said rotatable wall members respectively extending from said axis by a distance corresponding to the spacing of the floor member from said axis, the rotatably mounted wall members being configured for alternatively opening associated compartments to said balconies and closing said compartments, said floor member including catch portions for releasably engaging lower portions of said wall members in closing relation with said compartments.*

References Cited by the Examiner

The following references, cited by the Examiner, are of record in the patented file of this patent or the original patent.

UNITED STATES PATENTS

| | | | |
|---|---|---|---|
| 1,222,650 | 4/17 | Miller | 119—49 |
| 1,306,365 | 6/19 | Webster | 119—49 X |
| 1,358,119 | 11/20 | Shrock | 119—23 |
| 1,533,792 | 4/25 | Ewold et al. | 119—45 |
| 2,539,052 | 1/51 | Birky | 119—50 |
| 2,584,909 | 2/52 | Ockenfels | 119—45 |
| 2,793,614 | 5/57 | Duncan | 119—48 |
| 2,882,857 | 4/59 | Ernst et al. | 119—48 |
| 3,062,185 | 11/62 | Kurtz | 119—48 |
| 3,066,647 | 12/62 | Moller | 119—49 X |

FOREIGN PATENTS

| | | |
|---|---|---|
| 137,927 | 11/52 | Sweden. |

SAMUEL KOREN, *Primary Examiner.*

ALDRICH F. MEDBERY, *Examiner.*